J. C. BUTTERFIELD.
EXTRACTION OF TUNGSTEN FROM TUNGSTEN ORES.
APPLICATION FILED DEC. 23, 1915.
1,217,914.
Patented Mar. 6, 1917.
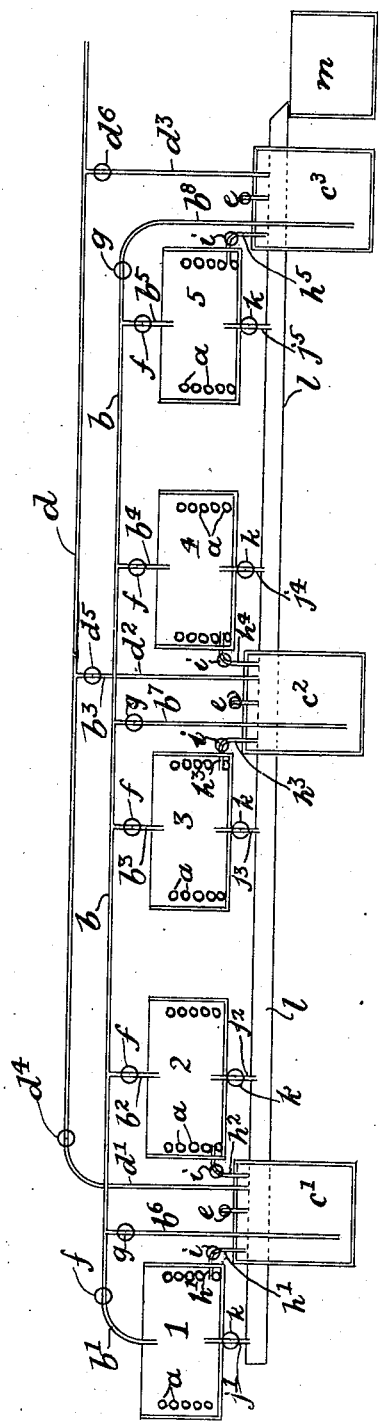
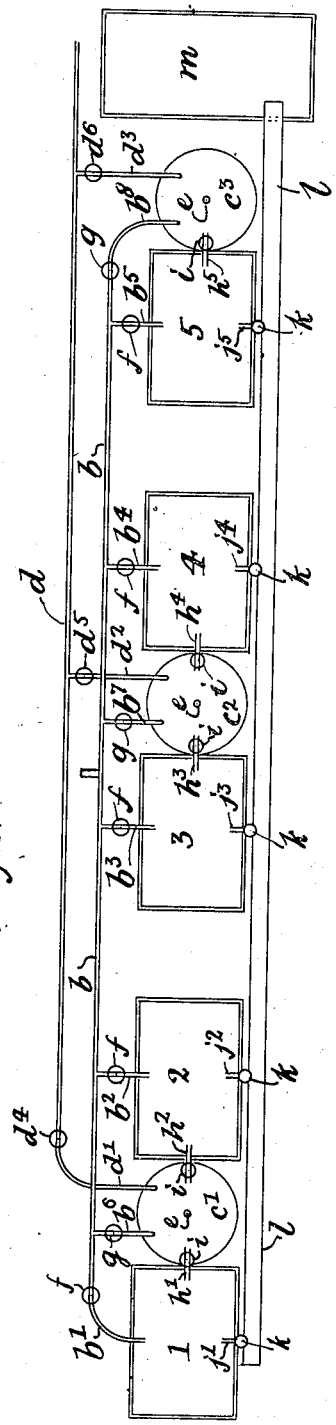
Inventor
John Cope Butterfield
By Attorneys,
Fraser, Duck & Myers

UNITED STATES PATENT OFFICE.

JOHN COPE BUTTERFIELD, OF BALHAM, LONDON, ENGLAND, ASSIGNOR OF ONE-HALF TO ARTHUR ASHWORTH, OF BURY, ENGLAND.

EXTRACTION OF TUNGSTEN FROM TUNGSTEN ORES.

1,217,914. Specification of Letters Patent. Patented Mar. 6, 1917.

Application filed December 23, 1915. Serial No. 68,323.

*To all whom it may concern:*

Be it known that I, JOHN COPE BUTTERFIELD, subject of the King of Great Britain and Ireland, residing at 79 Endlesham road, Balham, London, S. W., England, have invented certain new and useful Improvements in or Relating to the Extraction of Tungsten from Tungsten Ores, of which the following is a specification.

This invention relates to the extraction of tungsten from ores containing the same in combination with iron and maganese or with either of these, such as wolframite, feberite and hübnerite. As is known, wolframite contains tungstate of iron and manganese in varying proportions according to its origin, and in some cases but little manganese tungstate is present in it. Feberite likewise contains tungstate of iron and manganese while in hübnerite the tungsten is generally in the form of manganese tungstate.

The general method in use for the extraction of tungsten from such ores is to treat the ore in a furnace with excess of carbonate of sodium, whereby tungstate of sodium is produced, and this is in turn decomposed by treatment with acid to produce the yellow oxid of tungsten, which is then dried and heated with charcoal in a crucible in a wind furnace, the metal being thus obtained as a gray powder more or less alloyed with carbon.

This process requires great care and experience in manipulation, as otherwise serious loss may occur.

The object of the present invention is to provide a simple and economical process for the production of tungsten from ores of the kind before referred to.

According to the invention the ore is treated with dilute sulfuric acid to dissolve out to a greater or less extent the oxid of iron or manganese or both contained therein, and afterward the removal of said oxid or oxids is completed by treating the residue with a mixture of sodium chlorid and sulfuric acid, or of sodium chlorid, sodium nitrate and sulfuric acid (the sodium nitrate being added with advantage when the ore contains much manganese tungstate).

By this treatment the residue is exposed to the extractive action of hydrochloric acid liberated *in situ* evolved by the action of the sulfuric acid on the chlorid, and when sodium nitrate is also added the residue is likewise subjected to the action of chloronitric gas evolved from the nitrate and chlorid by the sulfuric acid.

The residue obtained after the above treatment and consisting of tungstic acid or oxid can be reduced to the metallic state.

The tungstic acid or oxid preferably briqueted or pressed into blocks or the like (hereinafter referred to as "briqueting") with or without a binder, is dried and reduced by heating in presence of a reducing gas such as carbonic oxid, hydrogen or coal gas, or it may be carbon incorporated with the tungstic oxid or acid, though a reducing gas is preferable, and the reduced metal is cooled in a reducing or non-oxidizing atmosphere or while being shielded from access of atmospheric oxygen.

The solution obtained from the extraction and containing sulfate of iron or sulfate of manganese or both, can be evaporated down and the sulfate or sulfates crystallized out, or the iron and manganese, when both are present, may be recovered separately by taking the mixed solution of the iron and manganese sulfates, neutralizing if necessary, and adding acetate of manganese and boiling, the manganese acetate being thereby decomposed and forming peracetate of iron which falls out of solution and can be removed in any suitable way, for example by a filter press. The remaining solution can then be evaporated down to recover the sulfate of manganese.

The crystals of sulfate of iron, or sulfates of iron and manganese may be calcined in a retort, with or without injection of steam, in order to decompose them into the state of oxid, and the residue be then washed and levigated, giving a product which can be made use of as "paint oxid". The acid vapors evolved in the calcination can be condensed and recovered for use again in the process.

In carrying out the invention, the extraction of the ore with dilute sulfuric acid will preferably be conducted in a series of tanks or vessels charged with the ore, the solution obtained from the first vessel being run into the second and so on throughout the series until the acid is practically neutralized and as much as possible of the iron or iron and manganese has been extracted from the ore. The residue can be subjected to the further extraction treatment with sulfuric acid and sodium chlorid, or sulfuric acid, sodium chlorid and sodium nitrate, in the same vessels or in other vessels.

In practice two sets of tanks or vessels may be employed, one set being used for the treatment of the ore with dilute sulfuric acid while the other set is being used for the further extraction treatment of the residue.

To illustrate how the invention can be carried into effect I will describe a typical example of its application with wolframite ore containing tungstate of iron and manganese.

The wolframite ore is ground by any suitable machine to fine powder (say 120 hole screen) and this is placed in wooden tanks lined with lead, or with an alloy of lead and tungsten, which alloy is unattacked by the solvents used in the process. The tanks are also each provided with a steam coil of lead (through which 40 or 50 lbs. pressure steam can be admitted) which runs around the sides of the tank and by means of which the solution used can be made to boil. The ore about half an inch in thickness is spread evenly over the bottom of the tanks, and that in the first tank is treated for three hours with a 50% (by volume) aqueous solution of sulfuric acid, the steam is turned on, and the liquid boiled, by which treatment a certain proportion of the iron and manganese in the ore is removed as sulfates of the metals, and the ore is made more easily attackable by the next treatment—or in technical terms the ore is "opened out."

After three hours' (more or less) treatment in this way in the first tank, the solution, while hot, is run off into the second tank, similar in every respect to the first, and is boiled in this tank in its turn for about 3 hours; then the solution is allowed to settle and is run off into the third tank, similar in all respects to the first and boiled here for a further period, and so on for a fourth, fifth or sixth tank if necessary, until the acid becomes neutralized and is no longer capable of dissolving more iron or manganese oxid.

When the solution used in the first tank has been run off into the second one, the first tank is again filled up with a solution consisting of about 70% water, and 30% of sulfuric acid (by volume) and again boiled for 2 or 3 hours, the solution being then run on to the next tank and so on for as many tanks as may be in use—by which treatment the iron and manganese are dissolved out of the ore so far as it is possible to extract the same by this treatment.

When the sulfuric acid treatment is finished in the tanks common salt is added to the residue in them in a suitable proportion, and it is of advantage to add nitrate of sodium in suitable quantities varying with the amount of manganese in the ore, it having been found by experience that the larger the quantity of manganese present the more desirable it is to add nitrate of sodium. For usual wolframite ores I have found that a quantity of common salt amounting to about 20 per cent. of the ore used, and a quantity of sodium nitrate amounting to about 10 per cent. of the weight of ore may be usefully employed. Sufficient sulfuric acid, preferably dilute, is then added to cause evolution of hydrochloric acid gas from the sodium chlorid and chloro-nitrous gas from the sodium nitrate and chlorid which gases oxidize the ferrous iron of the ore to ferric and dissolve it out of the residue, thus completing nearly entirely its removal, and at the same time the manganese is removed. If sodium chlorid and sulfuric acid are used without addition of sodium nitrate, a suitable proportion of salt for ordinary wolframite ores would be about 20 per cent. of the weight of the ore used.

The extracting treatment of the residue is repeated twice or more until the residue left in the tanks is of a canary color and is practically pure tungstic oxid ($WO_3$) which only requires drying to be ready for reduction to metal by heating with a reducing gas such as coal gas, hydrogen, carbonic oxid, producer gas or with charcoal.

If this residue is to be reduced by a reducing gas it is pressed while wet into briquets with or without the addition of any binding agent, by means of a briqueting press and these briquets after being carefully dried at a steam heat, are placed in a crucible which can be heated by producer or other gas, while the gas used as a reducing agent is admitted by a pipe through the bottom of the crucible and the products of reduction escape and mingle with the furnace gases through a hole in the lid. The reducing gas robs the tungstic oxid of the oxygen, producing metallic tungsten, which with this method of reduction will be practically free from carbon, an important point when the tungsten is to be used in the making of steel.

Carbon might however be used in some cases for the reduction instead of a reducing gas, and in such cases the residue may be mixed with charcoal or carbon before being briqueted.

The metallic tungsten is cooled down in the pot under such conditions as to be shielded from the access of atmospheric oxygen so as to prevent oxidation of the hot metal. This may be effected by cooling down the pot in an atmosphere of reducing gas or by embedding it in charcoal or carbon for the cooling operation or in any other suitable way.

When cold the metal can be turned out of the pot as a gray-black powder.

The accompanying diagrammatic drawings illustrate by way of example an arrangement of extraction apparatus for carrying out the invention, Figure 1 being in elevation, and Fig. 2 in plan.

1, 2, 3, 4 and 5 represent five open extraction tanks adapted to be heated by steam coils indicated by $a$. $b$ is an acid solution pipe arranged to deliver into the five tanks by branches $b^1$, $b^2$, $b^3$, $b^4$, $b^5$, and communicating by pipes $b^6$, $b^7$, $b^8$ with closed vessels $c^1$, $c^2$, $c^3$. Air under pressure from an air pipe $d$ can be admitted to the top of the vessels $c^1$ $c^2$ $c^3$ by the pipes $d^1$ $d^2$ $d^3$ controlled respectively by valves $d^4$ $d^5$ $d^6$, and the vessels $c^1$ $c^2$ $c^3$ are each provided with an air escape valve $e$. The branches $b^1$ $b^2$ $b^3$ $b^4$ $b^5$ are provided with valves $f$ and the pipes $b^6$ $b^7$ $b^8$ with valves $g$ to open or cut out the corresponding communications. $h^1$ $h^2$ $h^3$ $h^4$ $h^5$ are drain pipes fitted with valves $i$ and discharging into the vessels $c^1$ $c^2$ $c^3$ for the purpose of draining off acid solution from the tanks when required. $j^1$ $j^2$ $j^3$ $j^4$ $j^5$ are pipes fitted with valves $k$ and serving for draining off the neutral solution from the tanks into a launder $l$ below when the solution in the tanks has become neutral in the progress of the operation. The launder $l$ discharges into a settling tank $m$.

The tanks having been charged with a thin layer of finely ground ore as before explained a 50% by volume aqueous solution of sulfuric acid is poured into the first tank to be treated, say tank 1, and after the ore therein has been treated therein as mentioned and the solution has been raised to boiling by admitting steam to the coil $a$ of this tank, the resulting acid solution is run off into the vessel $c^1$ by opening the valve $i$ of the pipe $h^1$. This valve $i$ is then closed and the acid solution is sent forward from the vessel $c^1$ to the next extracting tank to be used, say tank No. 2, by opening the appropriate valves $g$ and $f$ (say valve $g$ of pipe $b^6$ and valve $f$ of pipe $b^2$) and turning air pressure on to the top of vessel $c'$ by opening the appropriate air valve $d^4$, the acid solution from the first tank is thus forced into the next tank to be used, where it is allowed to act on the ore, then raised to boiling, and afterward sent on to the next tank in a similar manner and so on, until it has become neutralized. It is then run off into the launder $l$ by the drain pipe of the tank in which it then is, say for example pipe $j^5$ of tank 5.

When the solution used in the first or given tank has been run off into the next one, the former tank can be filled up with a solution, consisting of about 70% water and 30% of sulfuric acid (by volume) and boiled as before mentioned, the solution being then sent forward to the next desired tank and so on for as many tanks as required.

The solution from a given tank can of course be sent to any other required tank by manipulating the desired solution transferring and air pressure valves and when the solution in a given tank has become neutralized it can be run off to the launder $l$ by opening the corresponding valve $k$.

When the sulfuric acid treatment is finished in the tanks, common salt, or common salt and nitrate of sodium, and sulfuric acid is added to them as before mentioned.

The above treatment can be repeated on the residue in the tanks until the residue left in the tanks is canary colored and practically pure tungstic oxid, which can then be worked up to tungsten as mentioned.

The solution obtained from the extraction of the ore in the tanks with dilute sulfuric acid can be taken and, after neutralizing any traces of acid if desired, it is evaporated down until crystals begin to appear, and it may be then left to deposit its crystals of iron and manganese sulfates. The crystals so obtained may be calcined by heating them in clean retorts (gas retorts), set in brickwork as in an ordinary gas setting, the retorts being provided with means for injecting steam into their mouths and with an exhauster, which pulls the acid vapors generated by the heat and passes the gases through a series of condensers of any appropriate kind, by which the sulfurous and sulfuric anhydrids are condensed along with the steam injected into the mouths of the retorts during calcination. The sulfates can be thus decomposed, leaving a residue of iron and manganese oxids, which can be withdrawn into cold water and afterward washed and levigated and can be made use of as "paint oxid."

If it is desired to remove the manganese separately from the iron instead of together therewith as just described, the mixed solution of iron and manganese sulfates from the extracting tanks can be taken and after neutralizing it, if necessary, sufficient acetate of manganese is added to convert the sulfate of iron on boiling, into peracetate of iron with formation of sulfate of manganese; the peracetate of iron falls out of solution on boiling and can be removed by a filter press or otherwise, and the remaining solution of manganese sulfate can be evaporated down and the manganese sulfate crystallized out.

What I claim and desire to secure by Letters Patent is:—

1. Process for the treatment of tungsten ores of iron or manganese, or both, comprising treating the ore with dilute sulfuric acid to dissolve out a portion of the oxid of iron or manganese, or both, contained therein;

and treating the residue with sodium chlorid, and sulfuric acid to complete substantially the removal of said oxid or oxids.

2. Process for the treatment of tungsten ores of iron or manganese, or both, comprising treating the ore with dilute sulfuric acid to dissolve out a portion of the oxid of iron or manganese, or both, contained therein, and treating the residue with sodium chlorid, sulfuric acid and sodium nitrate to complete substantially the removal of said oxid or oxids.

3. Process for the treatment of tungsten ores of iron or manganese, or both, comprising treating the ore with dilute sulfuric acid to dissolve out a portion of the oxid of iron or manganese, or both, contained therein, and liberating hydrochloric acid in the residue and thereby subjecting the residue to the action of hydrochloric acid, liberated *in situ* for the purpose specified.

4. Process for the treatment of tungsten ores of iron or manganese, or both, comprising treating the ore with dilute sulfuric acid to dissolve out a portion of the oxid of iron or manganese, or both, contained therein, and liberating hydrochloric acid in the residue and thereby subjecting the residue to the action of hydrochloric acid and chloro-nitrous gases liberated *in situ*, for the purpose specified.

5. Process for the treatment of tungsten ores of iron or manganese, or both, comprising treating the ore with dilute sulfuric acid to dissolve out a portion of the oxid of iron or manganese, or both, contained therein, and treating the residue with sodium chlorid and sulfuric acid to complete substantially the removal of said oxid or oxids, briqueting the residue wet, drying the briqueted product and heating the same in presence of a reducing gas to produce metallic tungsten.

6. Process for the treatment of tungsten ores of iron or manganese, or both, comprising treating the ore with dilute sulfuric acid to dissolve out a portion of the oxid of iron or manganese, or both, contained therein, and treating the residue with sodium chlorid, sulfuric acid and sodium nitrate to complete substantially the removal of said oxid or oxids, briqueting the residue wet, drying the briqueted product and heating the same in presence of a reducing gas to produce metallic tungsten.

7. Process for the treatment of compound tungsten ores, comprising treating the ores with hydrochloric acid by liberating hydrochloric acid *in situ* therein to attack the metals compounded with the tungsten in the ore, and separating the residue containing the tungsten from the separated metals.

8. Process for the treatment of compound tungsten ores, comprising treating the ores with hydrochloric acid and chloronitric gas by liberating hydrochloric acid and chloronitric gas *in situ* therein to attack the metals compounded with the tungsten in the ore, and separating the residue containing the tungsten from the separated metals.

In witness whereof, I have hereunto signed my name in the presence of two subscribing witnesses.

JOHN COPE BUTTERFIELD.

Witnesses:
THOMAS LAING WHITEHEAD,
ROBERT MILTON SPEARPOINT.